US005497324A

United States Patent [19]
Henry et al.

[11] Patent Number: 5,497,324
[45] Date of Patent: Mar. 5, 1996

[54] VEHICLE SUSPENSION SYSTEM WITH GAIN SCHEDULING

[75] Inventors: Rassem R. Henry, Clinton Township; Michael A. Applebee, Sterling Heights, both of Mich.

[73] Assignee: General Motors Corporation, Detroit, Mich.

[21] Appl. No.: 115,604

[22] Filed: Sep. 3, 1993

Related U.S. Application Data

[63] Continuation-in-part of Ser. No. 702,873, May 20, 1991, Pat. No. 5,276,621, and a continuation-in-part of Ser. No. 702,874, May 20, 1991, and a continuation-in-part of Ser. No. 702,875, May 20, 1991.

[51] Int. Cl.$^6$ .................................................. B60G 17/00
[52] U.S. Cl. ...................................... 364/424.05; 280/707
[58] Field of Search ....................... 364/424.05; 280/707, 280/840; 188/282

[56] References Cited

U.S. PATENT DOCUMENTS

| | | | |
|---|---|---|---|
| 4,606,440 | 8/1986 | Buchanan, Jr. et al. | 188/319 |
| 4,756,549 | 7/1988 | Kurosawa et al. | 280/707 |
| 4,907,154 | 3/1990 | Yasuda et al. | 364/424.05 |
| 4,921,272 | 5/1990 | Ivers | 280/707 |
| 5,004,079 | 4/1991 | Ivers et al. | 188/282 |
| 5,062,568 | 11/1991 | Majeed | 280/707 |
| 5,072,965 | 12/1991 | Wada et al. | 280/707 |
| 5,091,679 | 2/1992 | Murty et al. | 318/153 |
| 5,103,396 | 4/1992 | Hiwatashi et al. | 364/424.05 |
| 5,172,929 | 12/1992 | Butsuen et al. | 208/707 |

FOREIGN PATENT DOCUMENTS 1-111513  4/1989  Japan.

OTHER PUBLICATIONS

"Method of Manufacturing a Multi-Track Encoder Wheel for Brushless Motors," *Research Disclosure*, No. 33824, Jun. 1992, p. 442.

"Nonlinear Observers—A State-of-the-Art Survey," *Transactions of the ASME*, vol. 111 Sep. 1989, pp. 444–352.

"Properties of Min-Max Controllers In Uncertain Dynamical Systems," S. Gutman and Z. Palmor, Siam J. Control & Optimization, vol. 20, No. 6, Nov. 1982, pp. 850–861.

*Primary Examiner*—Gary Chin
*Attorney, Agent, or Firm*—Anthony Luke Simon

[57] ABSTRACT

An apparatus comprising a variable force suspension system including a wheel, a body portion and a variable force actuator, a sensor for detecting a relative velocity between the wheel and the body portion, a control circuit for detecting an occurrence of a present sign change in the relative velocity, for determining a time lapse between the present sign change and a previous sign change in the relative velocity, and for determining control gains responsive to the determined time lapse, and an actuator controller for controlling the variable force actuator responsive to the determined control gains.

4 Claims, 11 Drawing Sheets

VEHICLE SUSPENSION SYSTEM WITH GAIN SCHEDULING

This application is a continuation in part of U.S. patent applications, Ser. Nos. 07/702,873 (now U.S. Pat. No. 5,276,620), 07/702,874, and 07/702,875, all filed on May 20, 1991, all assigned to the assignee of this invention and the disclosures of which are all incorporated herein by reference. This application is related to the subject of copending patent application, Ser. No. 08/115,610, filed concurrently with this application, assigned to the assignee of this invention and the disclosure of which is incorporated herein by reference.

This invention relates to vehicle suspension systems and more particularly to a method and an apparatus for providing fast response gain shifting control of a variable force suspension system.

BACKGROUND OF THE INVENTION

In the field of vehicle suspensions, the phrase "quarter car suspension" refers to the components of the vehicle suspension relating to one of the four wheels of the typical automotive vehicle. These components include the particular wheel with a tire that is in contact with the road, a spring that transfers the road force to the vehicle body (sprung mass) and suspends the vehicle body, and a damper or actuator that reduces undesirable relative movement between the vehicle body and wheel. The complete suspension system of an automotive vehicle comprises four quarter car suspensions.

In recent years, vehicle manufacturers have dedicated significant effort to developing suspension systems responsive to the driving conditions of the vehicle. This effort is triggered by a desire to incorporate the best features of soft and stiff suspension systems into a single vehicle suspension system. The best feature of a soft suspension is the smooth ride it provides for the vehicle passengers. The best feature of a stiff suspension is the increased handling performance it provides for the vehicle.

The theory of semi-active suspension systems is to selectively switch between stiff suspension and soft suspension in response to the particular road and driving conditions of the vehicle. Selection between stiff suspension and soft suspension may be obtained by altering the damping force of the suspension system, e.g., a greater damping force for a stiffer suspension and a lower damping force for a softer suspension.

The theory of active suspension system controls is to provide an actuator force to the suspension system to reduce wheel hop and improve vehicle body attitude control beyond that achievable by damping forces alone. The actuator force is applied in equal and opposite directions between the wheel and vehicle body. Active and semi-active suspension systems can be commonly referred to as variable force suspension systems.

Difficulties in designing variable force suspension systems lie partially in system controls. A suspension system may, at any given time, be said to have a state. The suspension system state for a particular quarter of the vehicle includes the position of the vehicle body (the sprung mass), the position of the wheel (the unsprung mass), the velocity of the sprung mass, and the velocity of the unsprung mass. From these four components, the other characteristics of the quarter car suspension system may be determined. For example, the relative velocity between the sprung mass and the unsprung mass is equal to the velocity of the sprung mass subtracted by the velocity of the unsprung mass. The relative position of the sprung mass and unsprung mass is equal to the position of the sprung mass subtracted by the position of the unsprung mass. The relative velocity between the sprung and unsprung masses and/or the relative position of the sprung and unsprung masses may be included in what is referred to below as the relative system state.

In suspension systems, relative displacement between sprung and unsprung bodies may be primarily due to movement of the unsprung mass or primarily due to movement of the sprung mass.

Movement of the unsprung mass is caused by road disturbances and detecting and analyzing these occurrences is difficult. One way is to mount a sensor, e.g., ultrasonic, on the front end of the car to sense the road modulations from a given height. Techniques that require adding ultrasonic sensors to detect road modulations add to the cost of the controllable suspension system on the car. Unless separate sensors are provided, one sensor gives only a local view of the road and does not necessarily represent the road at other corners of the car.

Road conditions cannot accurately be determined by sensing body vertical and/or lateral acceleration signals, since high frequency wheel-hop is filtered by the body.

Another way to detect and analyze movement of the unsprung mass caused by road disturbances is to measure relative motion and use a fast fourier transform algorithm to compute amplitudes of different frequency components of the signals. Use of a frequency analyzer requires a lot of computing power and process delay times., e.g., 2 seconds at least for the 1 Hz. frequency to be detected.

Using the magnitude of the relative velocity between the sprung and unsprung masses to detect frequency can be misleading since these velocity amplitudes can be equally reached through body motion or wheel motion. Measurements at the vehicle center of gravity are only average signals of the four-corner inputs and performance and do not show specific information at a specific wheel.

SUMMARY OF THE PRESENT INVENTION

Advantageously, this invention provides a gain shifting control of the vehicle variable force suspension system that shifts suspension control emphasis between road holding and body motion to enhance system performance. Advantageously, this invention provides fast response control of a vehicle suspension system in response to changing road conditions. Advantageously, this invention provides the ability to respond to varying road conditions and shifting emphasis between road holding and body motion in time periods ranging from 10–500 milliseconds.

Advantageously, this invention determines relative velocity between the vehicle wheel and body and detects changes in the sign of the relative velocity. When a change in sign of the relative velocity is detected, the amount of time lapse since the previous sign change of the relative velocity is determined and this time lapse, representative of the frequency of the relative velocity, is used to schedule predetermined control gains for use in controlling the suspension system.

Thus, this invention uses the oscillation half period of the relative velocity at each corner of the vehicle to quickly detect and respond to different roads before it is too late. In one implementation, the relative velocity is determined through a sensor incorporated in the variable force suspension component allowing use of the single sensor to both control the variable force actuator and to detect road conditions.

Structurally, this invention comprises in a variable force suspension system having a wheel and a body portion to which the wheel is mounted with a variable force actuator, an apparatus comprising means for determining the relative velocity between the wheel and the body portion, means for detecting a present sign change in the relative velocity signal, means for determining a time lapse between the present sign change and a previous sign change, means for determining control gains responsive to the determined time lapse and means for controlling the variable force actuator responsive to these control gains.

A more detailed description of this invention, along with various embodiments thereof, is set forth below.

DETAILED DESCRIPTION OF THE INVENTION

Figure 1:
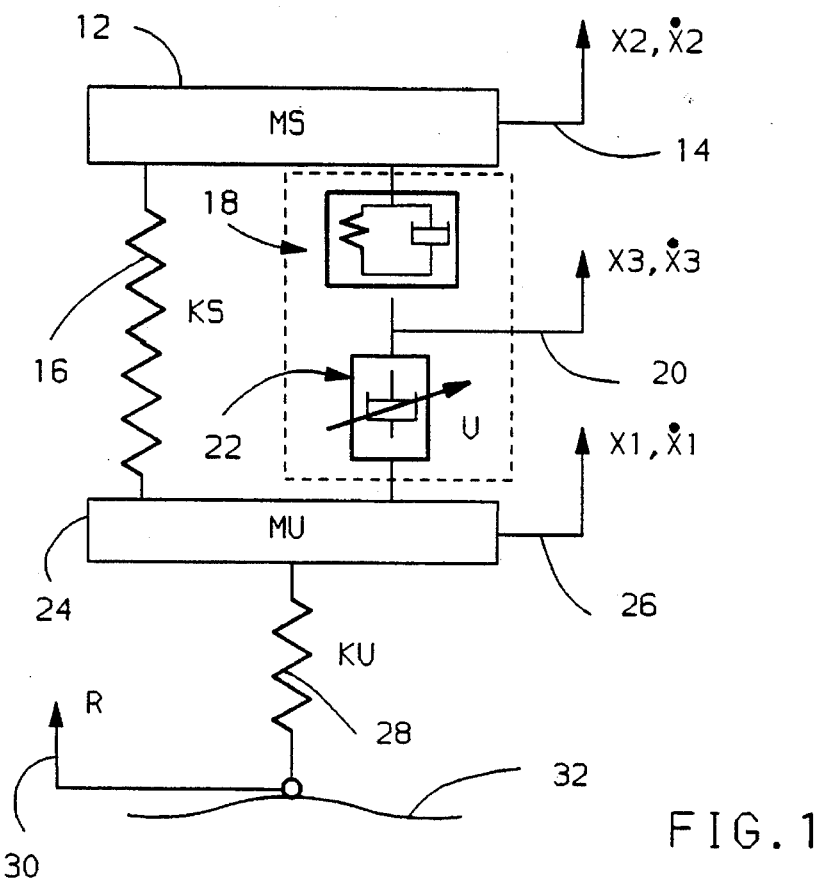
FIG. 1 is an equivalent schematic diagram of a variable force quarter car suspension.

A suspension system of the type in which this invention may be implemented to observe and control may be understood with reference to the model diagram of FIG. 1. In the Figure, reference numeral 12 generally designates the sprung mass, having mass $M_s$, which is the vehicle body supported by the suspension. The sprung mass has a position, $x_2$, and a velocity, $x_2'$, both represented by line 14. The sprung mass 12 is supported by the spring 16, having a constant $k_s$. The spring is also connected to the unsprung mass 24, which represents the vehicle wheel. The unsprung mass 24, having mass $M_u$, has a position, $x_1$, and a velocity, $x_1'$, both represented by line 26. The tire of the vehicle is modeled as a spring 28, having a spring constant $k_u$. The road is represented by reference numeral 32 and affects a displacement R (line 30) on the tire 28.

Variable force between the sprung and unsprung masses 12 and 24 is provided in the suspension system by actuator 22. Actuator 22 may be an adjustable damper, for semi-active systems, or an actuator capable of both damping and providing a force independent of damping on the suspension system. Actuator 22 may be an electromechanical machine, including a linear electromechanical machine, hydraulic shock with a flow control or bypass valve, or any other means of providing variable force to the suspension. The actuator 22 is attached between the unsprung mass 24 and a rubber bushing 18, which is modeled as a nonlinear spring in parallel with a damper. Rubber bushing 18 is similar to bushings used in engine mounts and is optional. If the rubber bushing 18 is omitted, the actuator 22 is attached directly to the sprung mass 12. In general, the actuator 22 exerts a force on the unsprung mass 24 and an equal and opposite force on the sprung mass 12, through rubber bushing 18, in proportion to the relative speed of the sprung and unsprung masses and/or an input control signal.

In the suspension system, the road 32 affects a displacement R on the tire 28, which in turn applies a force on the unsprung mass 24. The unsprung mass 24 transfers force to the spring 16, which in turn applies force on the sprung mass 12. The actuator 22 applies force on the sprung mass 12 (through bushing 18, if used) and unsprung mass 24: in the semi-active case, the force is applied in the direction opposite the relative direction of travel of the two masses; in the active case, the force may be applied in a direction that is the same as or opposite to the relative direction of travel of the two masses.

The bushing 18 is optional but may be preferable to help reduce the effect of high frequency road surface disturbance on the system. In the model of the suspension system set forth below, the effect of the rubber bushing is ignored and accounted for as a system uncertainty. Suspension systems of the type represented by FIG. 1 are easily implemented by those skilled in the art.

Figure 2:
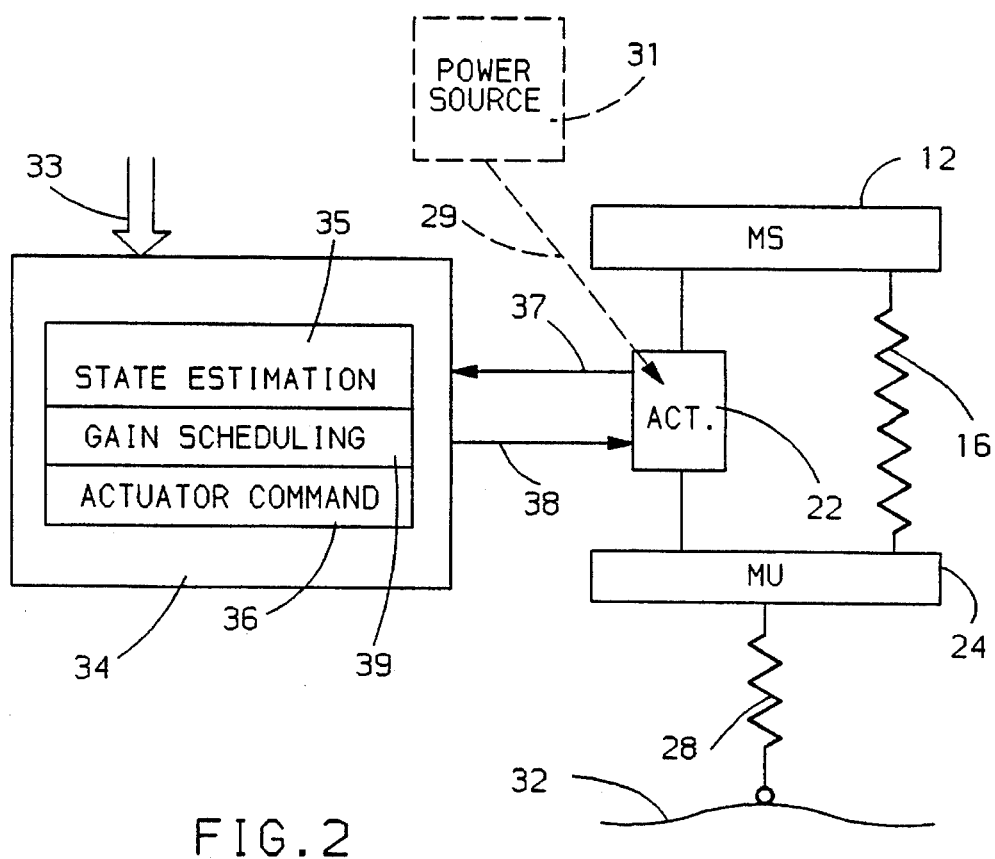
FIG. 2 is a schematic diagram of an example apparatus of this invention.

Referring to FIG. 2, the apparatus of this invention includes the controller 34 comprising a state estimator 35 (also referred to as the observer), gain scheduler 39 and an actuator command generator 36. The controller 34 receives a signal on line 37 representative of the relative system state. The signal on line 37 may be developed by a sensor incorporated within actuator 22 (as described in the above mentioned copending patent application Ser. No. 08/115,610 or an independent sensor, such as an LVDT (linearly variable differentiating transducer) or LVIT (linearly variable integrating transducer) (not shown). In response to the signal on line 37 and previous state estimations, the state estimator 35 estimates the present suspension system state.

Using the present estimated state and previous estimated states, and/or a position and or a relative velocity sensor, the gain scheduler 39 uses present and previous relative velocity information to schedule control gains according to this invention. According to this invention, the control gains are scheduled very quickly in response to the relative velocity as follows. The relative velocity between the wheel and the body are determined one of three ways: (a) through determination of the system state, and then summing the sprung and unsprung absolute velocities (note the sprung and unsprung absolute velocities are in opposite directions—one will have a positive value and the other a negative value); (b) through determination of rate of change of sprung and unsprung relative positions as sensed by a position sensor; or (c) through a relative velocity sensor.

Once the relative velocity is determined, the present relative velocity is compared to previous relative velocities.

When the relative velocity changes sign, the time period between the previous change of sign of the relative velocity signal and the most recent change of sign of the relative velocity signal is determined. The length of this determined time period between the sign changes of the relative velocity signals represents the dominant frequency of the relative movement and is then used as an input to a look-up table to schedule the actuator command gains.

The look-up table contains a plurality of sets of control gains for determining the actuator command. The scheduling of the gains operates to determine a select set of from the plurality of sets of control gains so that the select set may be used in determination of the actuator command until another set is selected in the same manner.

The actuator command generator 36 develops a command for actuator 22 in response to the state estimation and the scheduled gains and provides that command on line 38.

The actuator 22 may either be a variable force damper of the type used in semi-active systems or a variable force actuator of the type that applies force to the suspension system from an outside power source, such as in active systems. Actuator 22 may be a damping electromechanical actuator that variably generates and dissipates power, a damping hydraulic actuator with means for variable flow control, an electromechanical actuator to which power may be supplied, or a hydraulic actuator with power supplied by a source of pressurized hydraulic fluid. Examples of each of these forms of actuators are available to those skilled in the art. Box 31 represents a power source for supplying energy, e.g., in the form of electric current or hydraulic pressure, through line 29, to actuator 22, for use in active systems.

The bus 33 represents signals of various other vehicle parameters that may, at times, be taken into account to develop the actuator command at box 36. These signals may include semi-rigid body characteristics of a vehicle body and example implementations are set forth in detail below.

Figure 3:
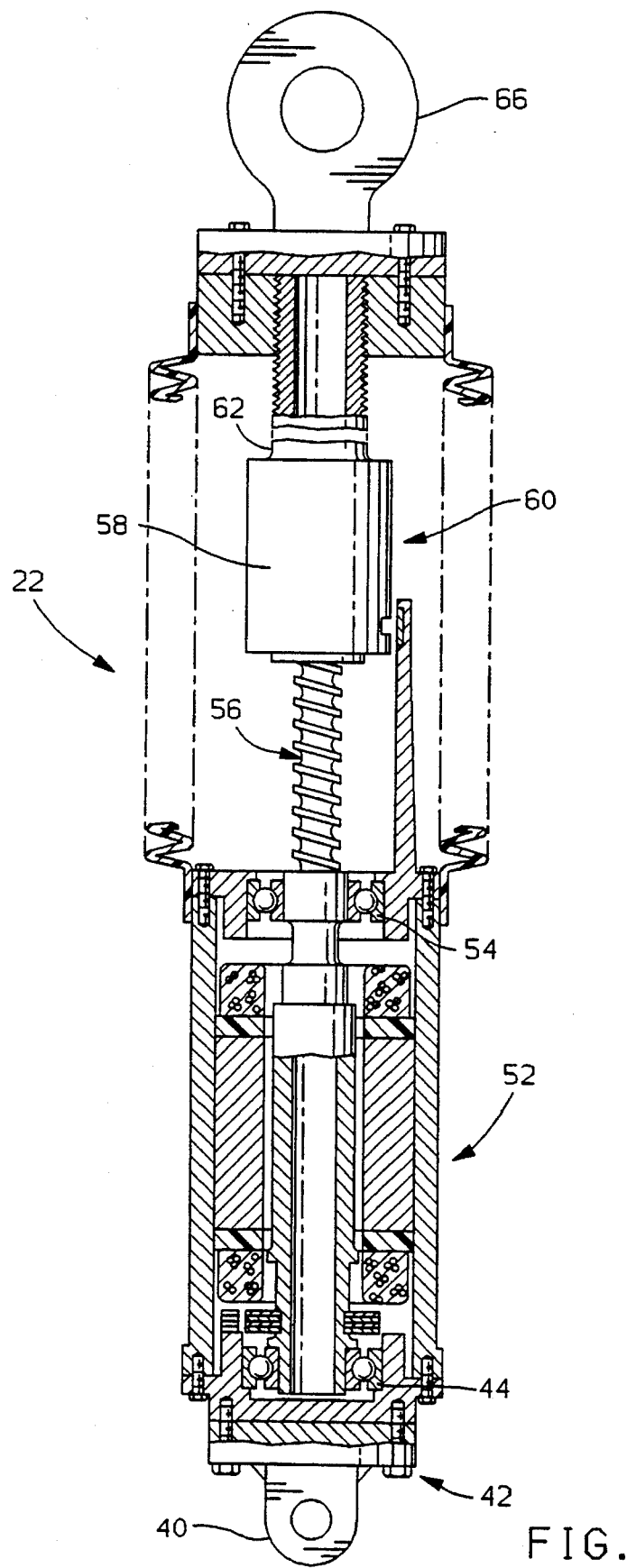
FIG. 3 is an example electromechanical damper for use in a variable force suspension system.

Referring to FIG. 3, one example of the actuator 22 may include the electromechanical machine 42 shown. In the Figure, the electromechanical machine 42 comprises a linear to rotary motion converter 60 and a rotary machine 52 comprising a multi-phase alternator/brushless motor device. The linear to rotary motion converter 60 includes a ball screw cage 58, hollow connector 62, screw 56 and mounting connector 66. The rotary machine 52 is rotatably mounted through bearings 44 and 54 to the other mounting connector 40. One of the two mounting connectors 40, 66 is mounted to the unsprung mass 24 (FIG. 1) and the other is mounted to the sprung mass 12 (FIG. 1), through rubber bushing 18, if used.

Through the relative movement of the sprung mass 12 and the unsprung mass 24 acting on the mounting connectors 40 and 66, the ball screw 56 is forced to rotate, rotating the rotary machine 52 and creating electric potential across the alternator coils, which may be coupled to a rectifier and variable load in a known manner.

In response to signals from the suspension controller, the variable load selectively dissipates the power generated by rotary machine 52 through a load resistor, providing the damping force for actuator 22. During high frequency movements of the unsprung mass 24, e.g., on a very bumpy road, the rubber bushing 18 (FIG. 1) attenuates the inertial effect of actuator 22 on the suspension system performance.

Optionally, the actuator 22 may be used as a brushless DC motor by including hall effect sensors and a means to sense rotary position such as the rotary encoder described in Research Disclosure No. 33824, published June, 1992.

Preferably the rotary encoder is a four-track encoder wheel which provides commutation pulses and high resolution rotary position signals. The encoder may comprise four co-planar encoder discs, three commutation encoder discs and one high resolution encoder disc, all of them properly spaced and oriented with respect to each other and over-molded to form a solid rigid assembly which is attached to the motor shaft.

The encoder of this type is intended for operation with a single package stationary sensor comprising four magnetic field sensitive devices, e.g., Hall effect sensors or magnetoresistors, spaced to match the spacing of the four co-planar encoder discs. The discs are made from a soft magnetic material, such as low carbon steel using a precision blanking process and have a balanced peripheral shape to provide proper position information to the Hall effect sensors. In response to the output signals from the sensors, an inverter circuit can be controlled in a known manner of controlling brushless DC motors to control output force of the actuator in accordance with commands developed by the controller.

When used as a brushless motor, actuator 22 can not only dampen the suspension system, but apply a force between the sprung and unsprung masses 12 and 24, both counter to and in the relative direction of travel of the two masses (damping force can only be opposite the relative direction of travel of the two masses 12 and 24). Another option is to use a linear electromechanical actuator.

Figure 4:
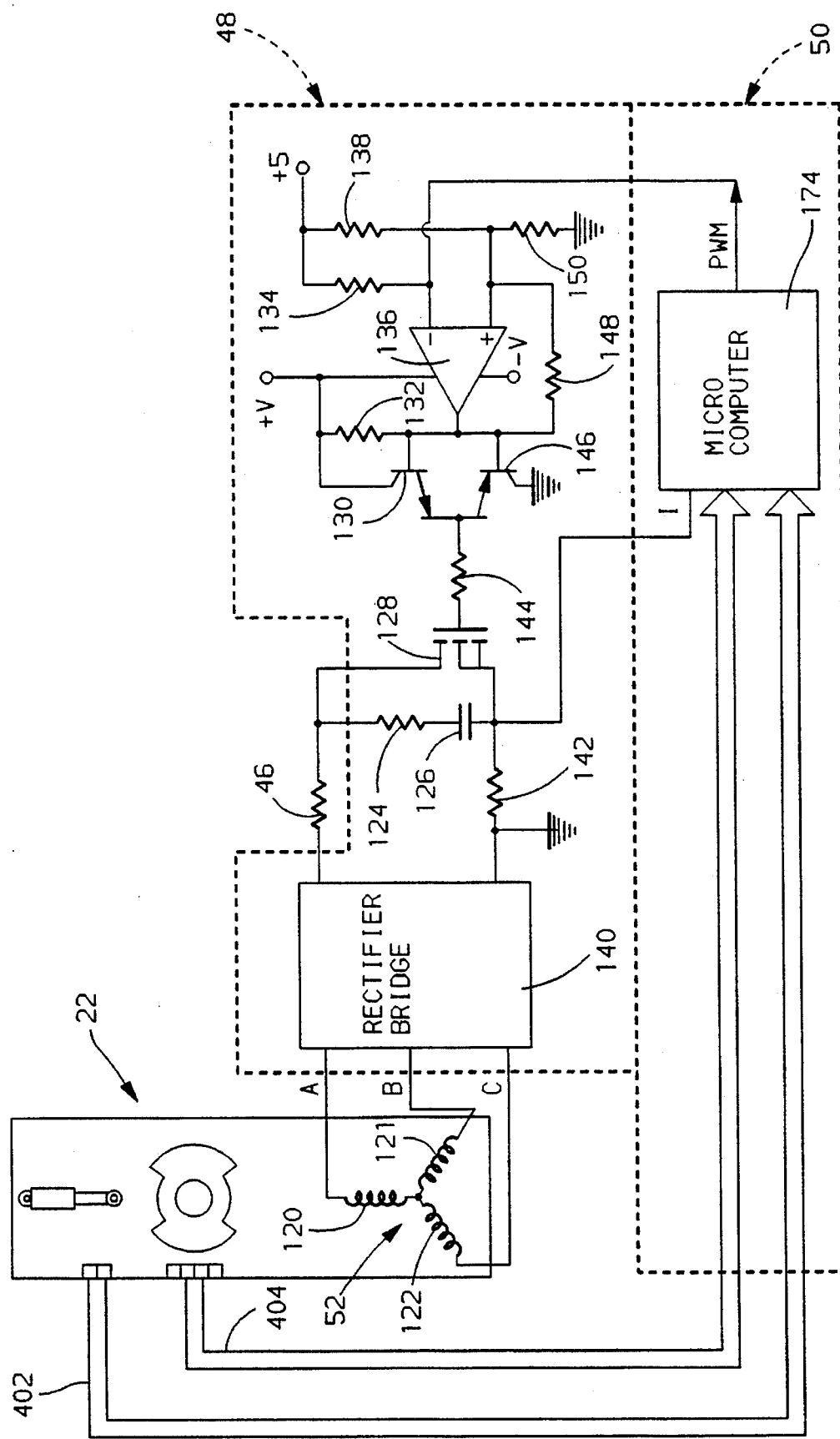
FIG. 4 is a schematic diagram of example circuitry for semi-active suspension system control.

The rectifier and variable load 48 and the controller 50 can be better understood with reference to FIG. 4. Coils 120, 121, and 122 of the alternator 52 are connected to a rectifier bridge 140 which rectifies the three phase voltage on lines A, B, and C. In response to a control signal on line PWM, the circuit comprising operational amplifier 136, transistors 130 and 146, and resistors 132, 134, 138, 144, 148, and 150 control MOSFET 128, selectively dosing a DC circuit between resistors 46 and 142, dissipating the power generated by alternator 52. The duty cycle of the signal on line PWM determines the amount of damping force. Example values for the resistors and capacitor are as follows: resistor 46, 1.67 $\Omega$, 150 W; resistor 142, 2 m$\Omega$; resistor 124, 50 $\Omega$; capacitor 33, 0.1 uF; resistors 134, 138, and 150, 10 K; resistor 148, 100 K; resistor 132, 1.5 K; and resistor 144, 100 $\Omega$.

Line I may be implemented as an option to provide a damping force feedback loop for electromechanical implementations. There will probably be sufficient inductance in the circuit of alternator 52, rectifier bridge 140 and load resistor 46 that the duty cycle modulation of MOSFET 128 produces an average DC current with a small ripple. If so, the current signal I read into microcomputer 174 is already averaged. If any additional averaging is required, it can be done with a standard digital averaging algorithm in microcomputer 174 applied to successive values of I.

As will be explained below, it is desirable for successful implementation of this invention to detect the relative velocity of the sprung and unsprung masses 12 and 24, otherwise known as the rattle space velocity, or the relative position of the sprung and unsprung masses 12 and 24. Either implementation is acceptable.

The rattle space velocity may be determined a variety of ways. One implementation is to determine the frequency of the zero crossings of the voltages on lines A, B, and C. U.S. Pat. No. 4,815,575, to Murty, assigned to the assignee of this invention, describes such a circuit and is incorporated herein by reference.

If the relative position of the sprung and unsprung masses 12 and 24 is to be determined, an LVDT/LVIT-type sensor (not shown) may be attached between the sprung and unsprung masses 12 and 24. The LVDT/LVIT sensor provides an output signal linearly related to distance between the sprung and unsprung masses and the output signal is provided to an A/D converter (not shown), the output of which is connected to the microcomputer 174 for processing.

The preferred implementation for measuring relative position includes the rotary encoder described above and the absolute position sensor described above. The rotary encoder provides an output signal on bus 404 indicative of relative movement of the sprung and unsprung masses, which relative movement can be kept track of on an up/down counter in the microcomputer 174. When absolute position signals are detected, the counter is compared to the predetermined value that the counter should be at when the absolute position signal is received. If the counter value is unequal to the predetermined value, the counter is corrected.

Any other suitable position sensor may alternatively be used.

In implementation with the actuator 22, this invention provides a state observer to be used in a control routine for microcomputer 174 to improve the response of actuator 22 in a semi-active quarter car suspension system. To provide optimal actuator control and suspension system performance, it is desirable to know the entire state of the system. The entire state of the system comprises the positions and velocities of the sprung and unsprung masses (ignoring the rubber bushing 18). As stated above, the relative state of the suspension system, including the relative velocity of the sprung and unsprung masses and/or the relative position of the sprung and unsprung masses is easily derived from the system state. In the case where the rubber bushing 18 is ignored, the system state may be set forth as a vector X as follows:

$$X = \begin{pmatrix} x_1 \\ x_1' \\ x_2 \\ x_2' \end{pmatrix},$$

where $x_1$ and $x_1'$ are the position and velocity of the unsprung mass 24 (FIG. 1) and $x_2$ and $x_2'$ are the position and velocity of the sprung mass 12. The positions of the unsprung and sprung masses 24 and 12 are preferably determined relative to an at rest position for the system.

To dispense with the expensive requirement of separate sensors to measure each component of the quarter car system state along with the difficulties in obtaining absolute state measurements, this invention provides a means for estimating the entire system state requiring the input of only one sensor that measures the relative system state. The single sensor may be a sensor that measures the relative velocity of the sprung and unsprung masses 12 and 24 or the relative position of the masses 12 and 24. One example of a sensor for measuring the relative velocity is the inherent inductance of the actuator 22 described in U.S. Pat. No. 4,815,575, assigned to the assignee of this invention. Another example of a sensor for measuring the relative velocity is to use the rotary position encoder and the Hall effect sensors described above with reference to FIG. 2, which indicates relative velocity by the frequency of the signals output from the Hall effect sensors. The sensors described above with reference to FIG. 3 can also be used for determining relative position as explained above. Another, more expensive, example of a sensor for measuring the relative position is an LVDT/LVIT sensor (readily available to those skilled in the art) attached to the sprung and unsprung masses 12 and 24.

When the sensor to measure the relative system state measures the relative velocity between the sprung and unsprung masses 12 and 24, the estimated relative system state includes an estimation of the relative velocity between the sprung and unsprung masses 12 and 24. When the sensor to measure the relative system state measures the relative position between the sprung and unsprung masses 12 and 24, the estimated relative system state includes an estimation of the relative position between the sprung and unsprung masses 12 and 24. It is preferable to measure relative position to minimize the effect of error integration.

Figure 5:
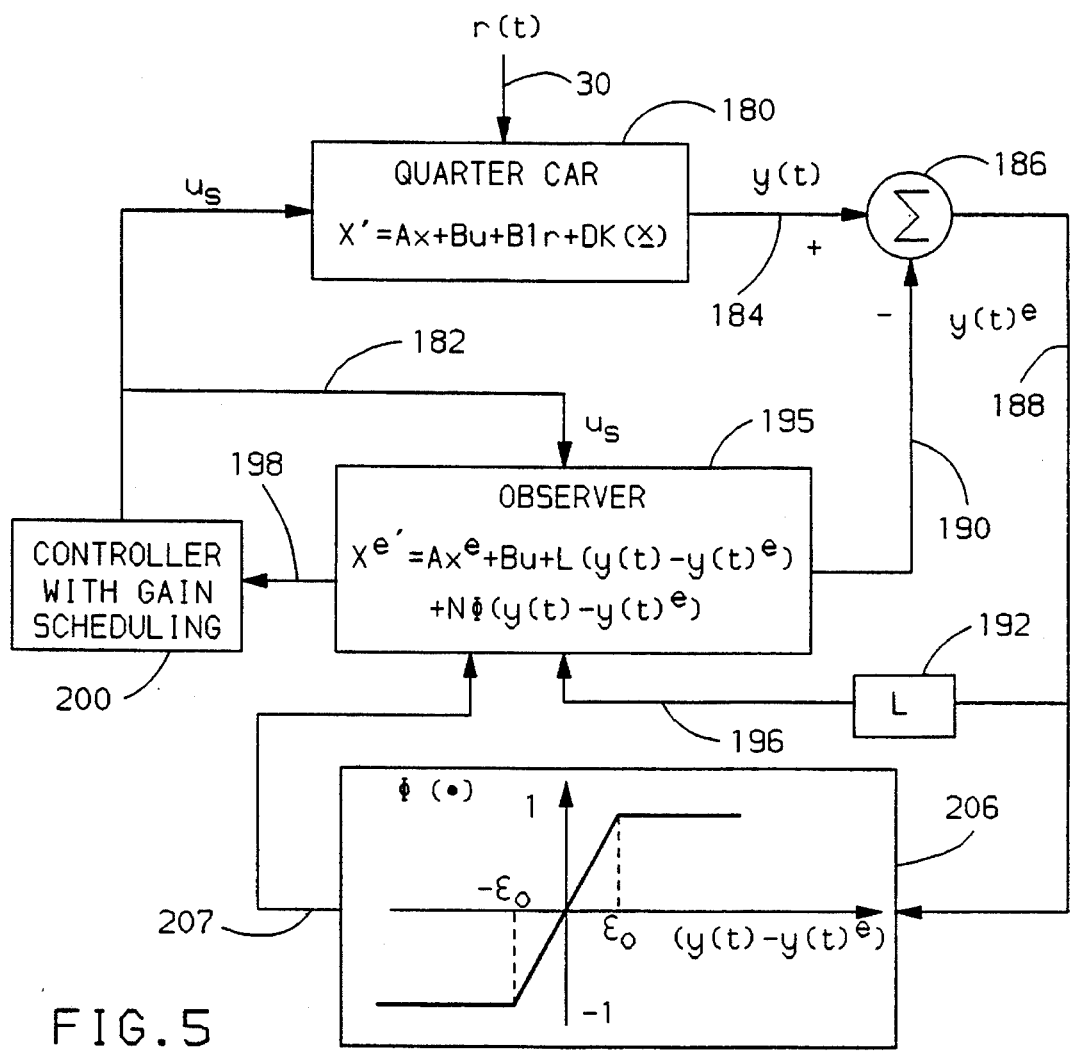
FIG. 5 is a schematic diagram of a control system according to this invention.

An example implementation of this invention includes the observer 195 shown in FIG. 5. The observer 195 estimates the entire system state $X^{e'}$ (comprising $x_1^e$, $x_1^{3'}$, $x_2^e$ and $x_2^{e'}$) and computes the estimated relative system state, $y^e(t)$. The estimated system state $X^{e'}$ is computed according to the following model:

$$X^{e'} = AX^3 + Bu + L(y(t) - y^e(t)) + N\Phi(y(t) - y^e(t)),$$

where A and B are standard model matrices for a suspension system with control, $X^e$ is the previous estimated system state, u is the control (representing the actuator force of actuator 22), L is a linear Luenberger matrix that provides stabilizing linear feedback (the function $L(y(t)-y^e(t))$ is referred to below as the linear correction term), y(t) is the measured relative system state of the sprung and unsprung masses 12 and 24, and where the term, $\Phi(y(t)-y^e(t))$ (referred to below as $\Phi(.)$), is a saturation function and provides a stable nonlinear element to the model that guarantees that state estimations progress in the direction of a stable sliding surface, $y(t)-y^e(t)=0$, on an X, X' stability plot.

For purposes of simplification of the model, the characteristics of the rubber bushing 18 (FIG. 1) are not modeled, but accounted for by the non-linear term as error. The estimated relative system state, $y^e(t)$, is related to the state, $X^e$, as follows:

$$y^e(t) = CX^e,$$

where the matrix C is a standard suspension system model matrix. The matrix A is a standard suspension model matrix easily implemented by one skilled in the art as follows:

$$A = \begin{pmatrix} 0 & 1 & 0 & 0 \\ a_1 & a_2 & a_3 & a_4 \\ 0 & 0 & 0 & 1 \\ a_5 & a_6 & a_7 & a_8 \end{pmatrix}.$$

In implementing the model, those skilled in the art realize that the model parameters of matrix A, in a damper where inertial effects are significant, are as follows:

$$a_1 = (j^2(k_s M_u - jn^2 k_u) - (k_u + k_s)c_1)/((M_u + jn^2)c_1);$$

$$a_2 = (jn^2 b_p M_u - c_1 b_p)/((M_u + jn^2)c_1);$$

$$a_3 = (c_1 k_s - jn^2 k_s M_u)/((M_u + jn^2)c_1);$$

$$a_4 = (c_1 b_p - jn^2 b_p M_u)/((M_u + jn^2)c_1);$$

$$a_5 = (k_s M_u - jn^2 k_u)c_1;$$

$$a_6 = b_p M_u/c_1;$$

$$a_7 = -k_s M_u/c_1;$$

$a_8 = -b_p M_u/c_1$;

where $b_p$ is the passive damping force on the system, e.g., when zero power is being dissipated in resistor 46 of actuator 22 above, j is the rotary inertia of the electromechanical machine 52, n is the gear ratio, and $c_1$ equals the quantity $(M_u M_s + jn^2(M_u + M_s))$.

The matrix B is as follows:

$$B = \begin{pmatrix} 0 \\ b_1 \\ 0 \\ b_2 \end{pmatrix},$$

where, for the system where inertial effects are significant, $b_1 = (jn_2 M_u - c_1)/((M_u + jn^2)c_1)$ and $b_2 = M_u/c_1$. If the relative system state is to comprise the relative velocity between the sprung and unsprung masses 12 and 24, the matrix C may be described as $C=[0\ 1\ 0\ -1]$, so that $y^e(t) = x_1^{e'} - x_2^{e'}$. If the relative system state is to comprise the relative position between the sprung and unsprung masses 12 and 24, the matrix C may be described as $C=[1\ 0\ -1\ 0]$, so that $y^e(t) = x_1^e - x_2^e$.

The Luenberger matrix L is generally solved for by determining a stable point for matrix $[A-LC]$, with its poles placed anywhere on the left half plane of the real-imaginary coordinate system provided that the pair (A, C) is observable. Those skilled in the art of state estimation can easily implement the Luenberger matrix with the limitations set forth above.

The first three terms of the model $(AX^e + Bu + L(y(t) - y^e(t)))$ are a linear estimation of the system state. However, because of the difficulty of measuring the absolute displacement of the suspension system, the nonlinear mount, the system uncertainties, and the unknown road disturbances, the linear equation alone cannot converge the estimated system state to the actual system state. To ensure accurate estimations of $X^{e'}$, the saturation function $\Phi(.)$ is added.

To further clarify the nonlinear function, assume the worst case (normal operation) road disturbance and other uncertainty effects on the suspension system can be represented by a term Ed, where d=1 for the worst case. One skilled in the art can easily determine E. Since, for the worst case d=1, for any given normal driving condition, $|d|>1$. If N is set equal to EY, where $|Y| \geq 1$, then a stable nonlinear function, $\Phi(y(t) - y^e(t))$, can be set up as follows:

$$\Phi(y(t) - y^e(t)) = \begin{cases} 1, & (y(t) - y^e(t)) \geq \epsilon_o \\ (y(t) - y^e(t))/\epsilon_o, & -\epsilon_o < (y(t) - y^e(t)) < \epsilon_o \\ -1, & (y(t) - y(t)e) \leq -\epsilon_o \end{cases}$$

where $\epsilon_o$ defines an error limit around the sliding surface $y(t) - y^e(t) = 0$ within which the system is linearly stable and outside of which the system is non-linearly stable. To ensure nonlinear stability, all real parts of a function $H_1(j\omega)$ must lie to the right of $-1/G$ on a real/imaginary plot, where:

$H_1(j\omega) = C(j\omega I - A + LC)^{-1} N$, and $G = (1 + 1/Y)/\epsilon_o$.

To ensure linear stability within the boundary layer defined by $\|y(t) - y^e(t)\| < \epsilon_o$, the following matrix must be stable:

$[A - (L + N/\epsilon_o)C]$.

To optimize the system, assume a high Y and a low $\epsilon_o$, and adjust $\epsilon_o$ until the system is stable. If the system cannot be stabilized, lower Y and again adjust $\epsilon_o$. In general, a smaller $\epsilon_o$ corresponds to a smaller allowable error. Repeat the adjustment of Y and $\epsilon_o$ until an optimum stable system is found. It is preferable to find several stable combinations of Y and $\epsilon_0$ and to pick the system that yields the smallest estimation errors.

With the above information, one skilled in the art can easily implement the nonlinear term $N\Phi(.)$ to achieve a stable system. During normal driving conditions, the resulting control system is linearly stable and the estimated system state can converge to the actual system state (zero error condition). During driving conditions such as a wheel hitting a large pothole or a large rock, the control system is non-linearly stable and progresses to a state where it is linearly stable.

Figure 6:
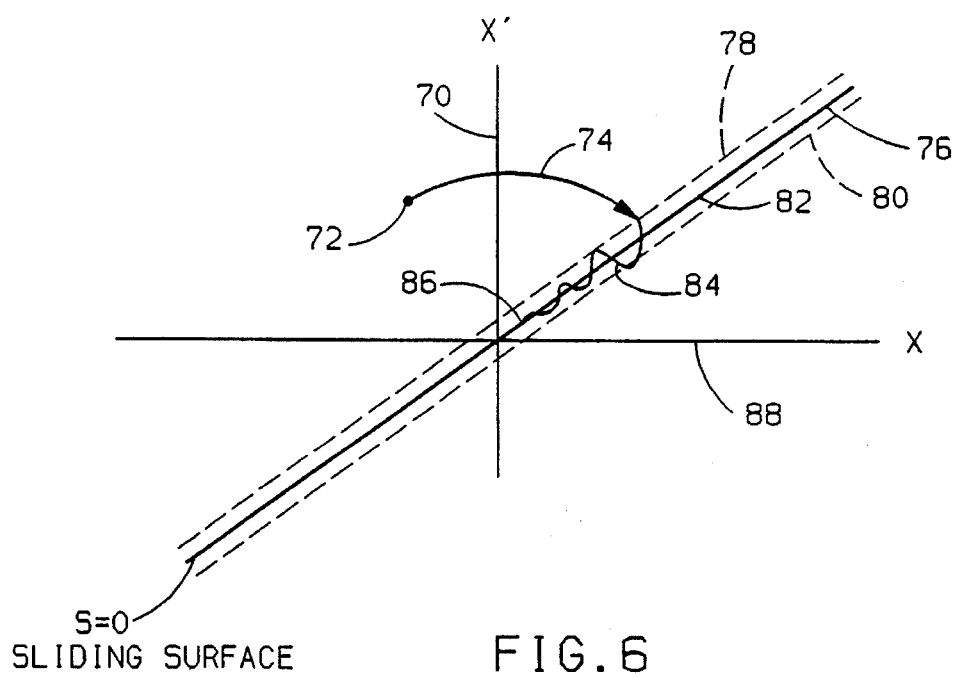
FIG. 6 is a sliding surface plot illustrating the operation of the control of FIG. 5.

FIG. 6 is an illustrative example of how the stable observer achieves accurate estimations. Line 76, referred to as a sliding surface, on the X and X' axes, 88 and 70, represents the actual suspension system state. Whenever state estimated by observer 195 falls on sliding surface 76, the estimation error is zero. Assume that a large disturbance on the suspension system causes state estimation error, the estimated state represented by point 72, not on the sliding surface 76. When this occurs, the saturation function saturates the state estimations in a manner to cause the state estimations to return toward the sliding surface 76 along a path, such as path 74. In this mode, the observer is acting non-linearly. Once the state estimation is within a boundary shown as dotted lines 78 and 80 (corresponding to $\epsilon_o$) of the sliding surface 76, the observer is linear and the state estimations oscillate along path 84 until the estimated states converge with the actual state at point 86. An important feature of this control method is that the estimation error is guaranteed to go to zero without having to satisfy a matching condition in the design phase of the system.

Referring to FIG. 5, the state estimation by the observer 195 can be easily understood. The road disturbance on line 30 and the actuator force on line 182 affect the quarter car suspension system, represented by block 180, such that an actual relative system state, y(t), on line 184 is developed. At block 186, the estimated relative system state, $y^e(t)$, is compared to the actual relative system state, and an error signal, $e(t) = y(t) - y^e(t)$, on line 188, is developed. The error signal on line 188 is multiplied by the Luenberger matrix L at box 192 and the result is added with the rest of the estimation model in block 195. The error signal on line 188 is also input into the nonlinear function box 206 where the nonlinear saturation function $\Phi(.)$ is determined and added with the rest of the estimation model in block 195.

A signal representative of the actuator force command, us, from the controller 200 is input into block 195 through line 182 (optional). The system actuator force, u, is determined at block 195 through one of a variety of different means. The actuator force, u, may be determined in relation to a signal indicative of current supplied to or generated by the actuator. Alternatively, the actuator force, u, may be determined from a three dimensional look-up table with reference to y(t) and the controller command, $u_s$, described below. In block 195, the estimations $X^{e'}$ and $y^e(t)$ are determined as described above and output on lines 198 and 190, respectively.

Block 200 is a modified Lyapunov controller with gain shifting according to this invention and represents one example of how this invention may be used for suspension system control. The modified Lyapunov controller 200 controls the actuator force (line 182) of the quarter car system in response to the estimated state $X^e$ on line 198 in a manner to drive the state to a reference condition.

The value of the state $B^TPX^e$ can be expanded as follows:

$$B^TPX^e = Gwdx_1 + Gwvx_1' + Gbdx_2 + Gbvx_2'. \quad (A)$$

Where $x_1$ is the wheel absolute displacement, $x_1'$ is the wheel velocity, $x_2$ is the body absolute displacement and $x_2'$ is the body velocity. The gains, Gwd, Gwv, Gbd and Gbv are predetermined in the manner easily achieved by one skilled in the art in view of the following discussion.

Figure 7:
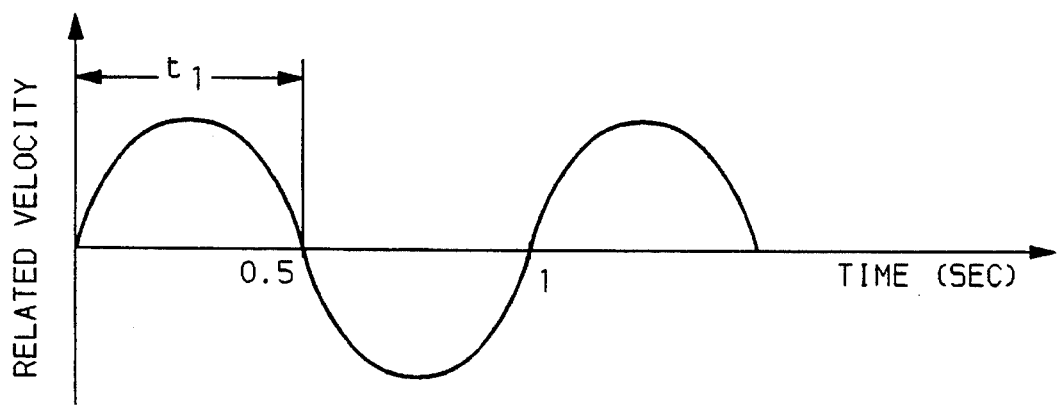
FIGS. 7–10 illustrate example suspension system relative velocity patterns.

Referring to FIG. 7, an example relative velocity signal (shown) has the frequency of 1 Hz. and changes sign every 0.5 seconds. The velocity signal shown is a signal indicative of body motion and when the body is moving as such, the gain control desirably emphasizes body stability.

Figure 8:
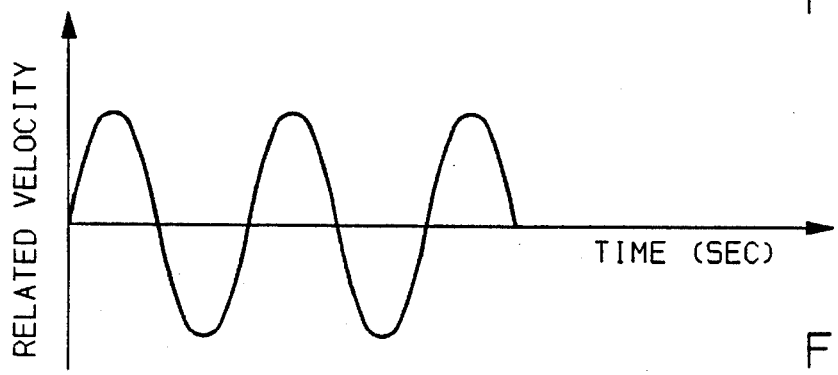

Referring to FIG. 8, the signal shown is an example relative velocity signal having a frequency of 10 Hz. and a sign change occurring every 50 milliseconds. This signal is an example signal caused by wheel-hop for fast wheel movement due to a bumpy or rough road. When such circumstances exist, it is desirable to emphasize the wheel gain controls.

Figure 9:
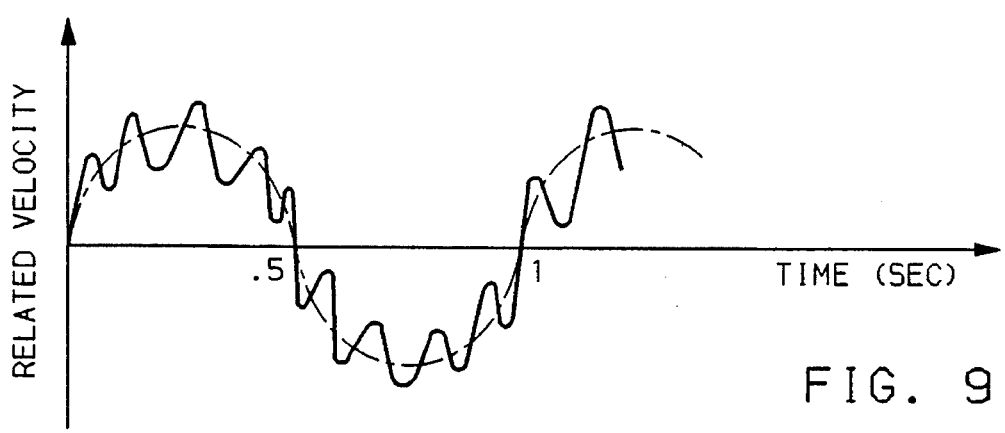

Referring to FIG. 9, the signal shown is a relative velocity signal having a primary component caused by body motion and a secondary component caused by wheel-hop.

Figure 10:
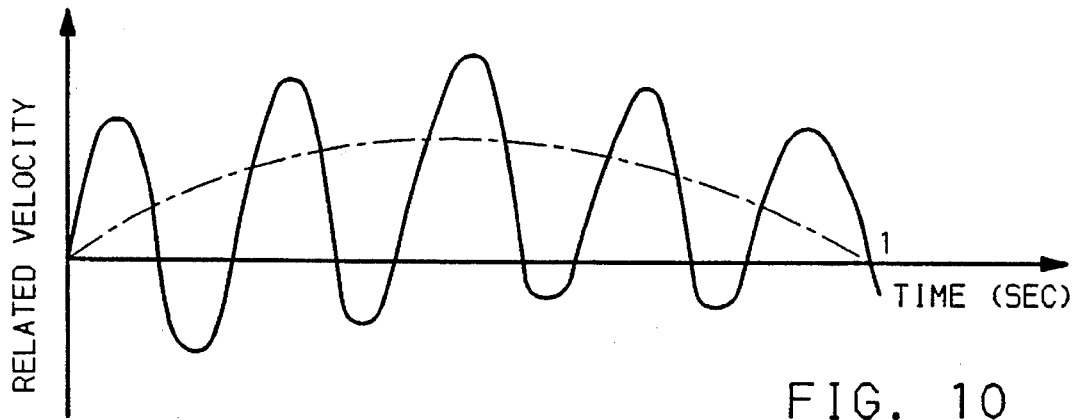

FIG. 10 shows a relative velocity signal having primary component caused by wheel-hop and a secondary component caused by body motion.

Figure 11:
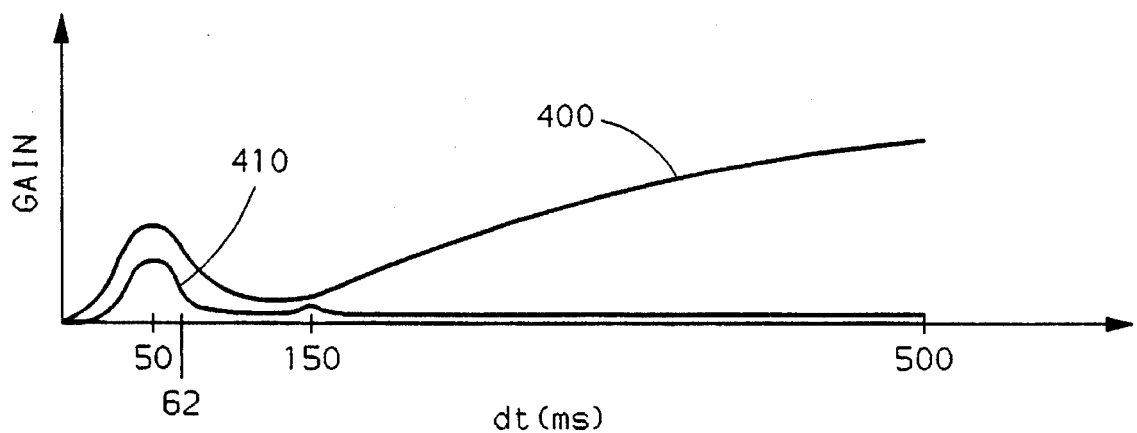
FIG. 11 comprises a diagram of wheel and body gains verses relative velocity half period according to this invention.

Referring now also to FIG. 11, reference 400 and reference 410 represent gain schedules for body and wheel gain components respectively. As illustrated in FIGS. 7–10, it is possible to determine the primary signal component of a relative velocity signal based on the time lapse between changes of sign of the relative velocity signal.

Preferred control gains versus frequency of the relative velocity signal are as follows. Body motion such as heave, pitch and roll typically occur around 1–3 Hz. Thus, when the time period between the sign changes is in the range from 150–500 milliseconds, the gain should accent control of body motion. The range of relative velocity frequency between 3–8 Hz. can be categorized as a human comfort range and grouped together as a group in which minimum damping is required. The last main frequency range, between 8–12 Hz., is the wheel-hop frequency range. In this range, wheel control is accentuated in the scheduled gains. For half cycles below 40 milliseconds, this frequency is higher than a frequency that can be typically controlled by a limited band width damper and, therefore, low gains or no damping are provided. For half cycles greater than 500 milliseconds, which is a low frequency of body motion, this may indicate that there is no relative motion between the sprung and unsprung masses and, therefore, damping control is minimal.

Applying these ranges to the scheduling in FIG. 11, the body gains represented by line 400, are high for low frequency relative velocity signals and the wheel gains represented by line 410, are low so that the determination of the control output accents body motion control. For relative velocity half periods between approximately 60 and 150 milliseconds, both body motion and wheel motion gains are low since this is the human comfort range and minimum damping is required. For relative velocity half periods around the 50 millisecond duration, wheel gains are accented as shown in the peak in the wheel gain trace 410 and body motion control gains are also accented, although not as high as during the low frequency control. When the gains are scheduled, equation (A) above is solved using the states $x_1$, $x_1'$, $x_2$, $x_2'$ determined in the observer 195. The value $B^TPX^e$ is then used in the Lyapunov controller The typical Lyapunov controller is a two state min-max controller. However, the modified Lyapunov controller, which is the subject of the above identified patent application, Ser. No. 07/702,873, assigned to the assignee of this invention, has the following control function:

$$u_s = - \begin{cases} 0, & \|B^TPX^e\| \leq \epsilon_d \\ (B^TPX^e)\rho/\|B^TPX^e\|, & \|B^TPX^e\| \geq \epsilon, \\ (B^TPX^e - \|B^TPX^e\|\epsilon_d/(B^TPX^e))\rho/(\epsilon - \epsilon_d), & \epsilon_d < \|B^TPX^e\| < \epsilon \end{cases}$$

where $\epsilon_d$ is the dead zone limit set to correspond to sensor noise and the allowable estimation error (if any), $\epsilon$ is the boundary layer limit set greater than $\epsilon_d$ to ensure smooth transition between minimum and maximum actuator force (thereby eliminating chatter), $\rho$ is the maximum available force at a given rattle space velocity, and $\|B^TPX^e\|$ as can be referred to as the magnitude of the system state.

When the controller output, $u_s$, is zero, the actuator force, u, is the minimum dumping of the system, which may be zero or may follow a rattle space velocity dependent curve. When $u_s$ is $(B^TPX^e)\rho/\|B^TPX^e\|$, the actuator force u is the maximum actuator force of the system (in the semi-active case the maximum actuator force is a damping force and may be dependent upon rattle space velocity). When $u_s$ is $(B^TPX^e - \|B^TPX^e\|\epsilon_d/(B^TP_{X^e}))\rho/(\epsilon-\epsilon_d)$, the actuator focus is $(\|B^TPX^e\|-\epsilon_d)/(\epsilon-\epsilon_d)$ percent between the minimum actuator force and maximum actuator force for the particular rattle space velocity.

Figure 12:
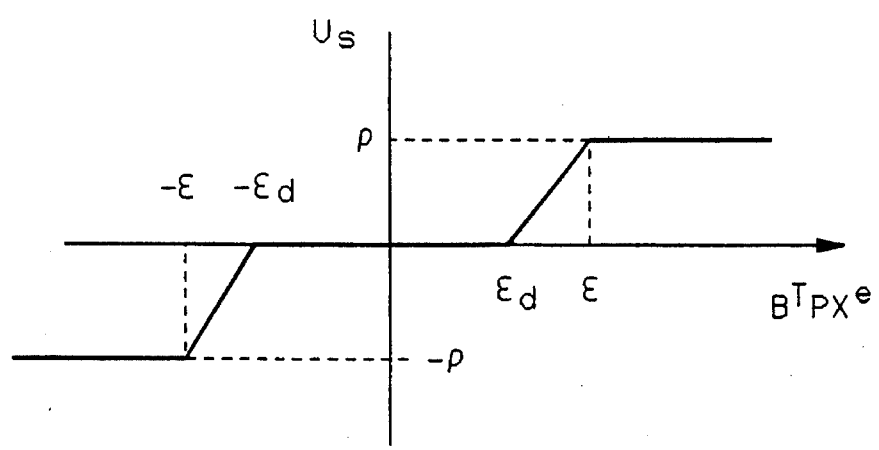
FIG. 12 illustrates suspension control according to this invention.

The output of the controller is shown in FIG. 12. The dead band, between $-\epsilon_d$ and $\epsilon_d$ on the $B^TPX^e$ axis, represents minimum possible damping and eliminates detrimental effects of noise and estimation error on the system. The transfer regions between $-\epsilon$ and $-\epsilon_d$ and between $\epsilon$ and $\epsilon_d$ on the $B^TPX^e$ axis prevent chatter in the suspension system. The regions below $-\epsilon$ and above $\epsilon$ provide maximum available actuator force in the proper direction on the suspension system.

In implementation in a semi-active system, the controller 200 is stable as long as matrix A is stable because the force, u, is always a damping force. In implementation in an active system, the control parameter must be chosen correctly to maintain a stable system. Stability in the dead band is achieved as long as matrix A is stable. The transfer regions are stable as long as a matrix $(A-\rho BB^TP/(\epsilon-\epsilon_d))$ is stable. If the above two stabilities are met, then the maximum actuator force regions are stable.

The gains for the system using the Lyapunov controller are determined by minimizing the following function:

$$\delta = \int_0^\infty X^TQX dt,$$

which can easily be accomplished by one skilled in the art. The above function is minimized to obtain different matrices Q, which emphasize different body states. For example, the matrix:

$$Q = \begin{bmatrix} 0 & 0 & 0 & 0 \\ 0 & 0 & 0 & 0 \\ 0 & 0 & 0 & 0 \\ 0 & 0 & 0 & 1 \end{bmatrix}$$

emphasizes body velocity. By moving the 1 in the last row of matrix Q to the third row and the third column, body position is emphasized. By moving the 1 in the last row of matrix Q to the second row and the second column, wheel velocity is emphasized and by moving the 1 in the last row of matrix Q to the first row and the first column, wheel position is emphasized. It is appreciated that the actual values of the components of matrix Q may vary and are ultimately determined by the performance result desired by the system designer.

After each matrix Q is determined, the resultant Lyapunov equation:

$$A^T P + PA + Q = 0$$

is solved to compute the corresponding positive definite matrix P. Thus a matrix P is solved for each emphasized control state. For example $P_1$ can be solved with $Q_1$ emphasizing body velocity more than wheel velocity, $P_2$ can be solved with $Q_2$ emphasizing wheel velocity more than body velocity and $P_3$ can be solved with $Q_3$ emphasizing body velocity and wheel velocity equally. It is appreciated that the actual number of matrices P and the amount of emphasis on each state of each matrix Q will vary from implementation to implementation as the system designer desires.

The matrix $B^T P$ is then computed for each P and expands as:

$$B^T T = [Gwd\ Gwv\ Gbd\ Gbv].$$

The gains are then be stored in a look up table in memory where they are scheduled as described herein.

For example, when the time lapse between detected sign changes of the relative velocity between the vehicle body and wheel indicates that body velocity is to be emphasized, a first set of gains $Gwd_1$, $Gwv_1$, $Gbd_1$, and $Gbv_1$ is used in the controller. When the time lapse between detected sign changes of the relative velocity between the vehicle body and wheel indicates that wheel velocity is to be emphasized, a second set of gains $Gwd_2$, $Gwv_2$, $Gbd_2$, and $Gbv_2$ is used in the controller. When the time lapse between detected sign changes of the relative velocity between the vehicle body and wheel indicates that both wheel velocity and body velocity are to be emphasized, a third set of gains $Gwd_3$, $Gwv_3$, $Gbd_3$, and $Gbv_3$ is used in the controller.

In an example implementation of this invention with actuator 22 in FIGS. 3 and 4, the microcomputer 174 executes a control routine that estimates the system state and calculates the desired actuator command $u_s$. The signal on line PWM is pulse width modulated, preferably at a frequency of about 2 kHz, to provide the desired damping force. For example, if $\|B^T P X^e\| \leq \epsilon_d$, then the duty cycle of the signal on line PWM is zero, resulting in zero power dissipation through resistor 46. If $\|B^T P X^e\| \geq \epsilon$ then the duty cycle of the signal on line PWM is 100 percent, resulting in maximum dissipation of power in resistor 46. If $\epsilon_d < \|B^T P X^e\| < \epsilon$, then the duty cycle on line PWM is $(\|B^T P X^e\| - \epsilon_d)/(\epsilon - \epsilon_d)$.

As an optional feature, a measure of the actual damping force may be provided to the microcomputer through the signal on line I and may be used by the microcomputer in calculating the estimations at block 194. In actual practice, there may be some inherent damping in actuator 22 due to friction. This inherent damping may be either accounted for in the controller in relation to rattle space velocity, may be accounted for as part of $b_p$, or may be lumped in with the system error for purposes of this invention.

Figure 13:
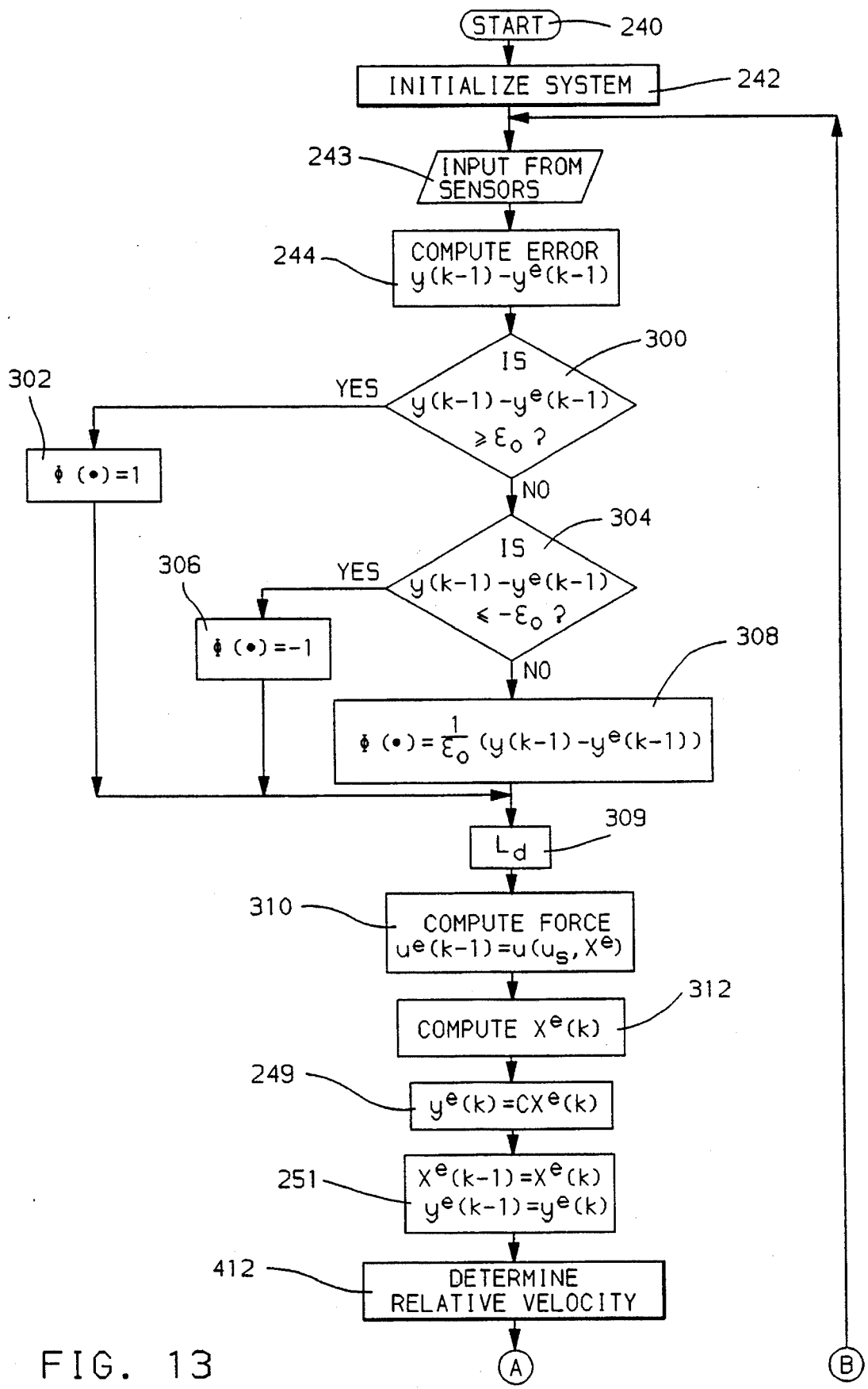
FIGS. 13 and 14 comprise a flow diagram for computer implementation of this invention.
Figure 14:
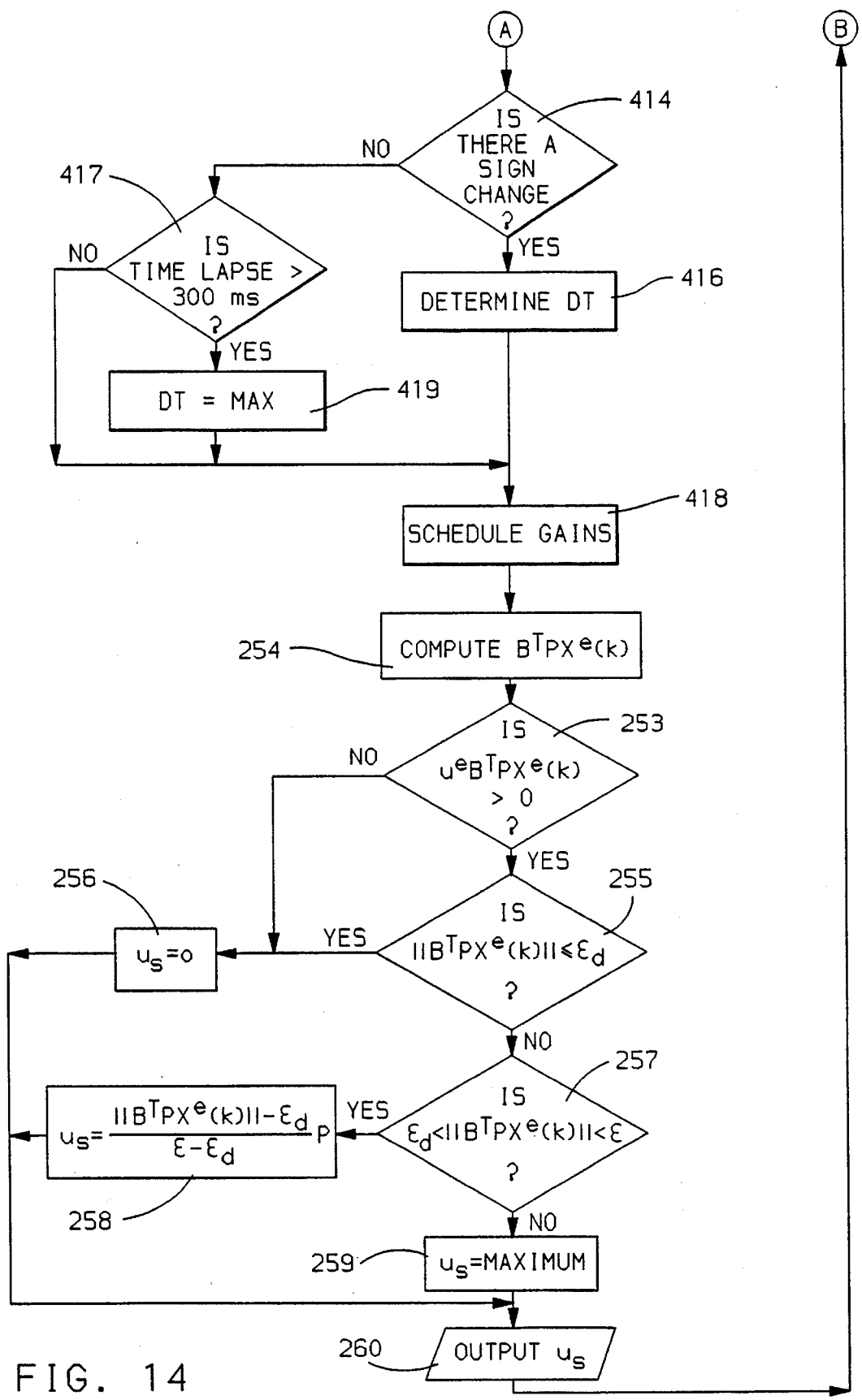

The flow diagram of FIGS. 13 and 14 are an example of a computer implementation of this invention. The program starts at block 240 and initializes the system at block 242 (start-up only). During initialization, the computer assigns zeros as the standard initial values to the estimated system states, $X^e(k-1)$ and $y^e(k-1)$, which are discrete representations of $X^e$ and $y^e(t)$ with k being the current time event and k-1 being the previous time event. Block 242 also assigns an initial value to the damping force signal, $u_s(k-1)$. At block 243, the controller receives the sensor input including a signal representative of the relative system state $y(k-1)$ and, at block 244, determines the error between the measured and the previously estimated relative system state signals, $y(k-1) - y^e(k-1)$.

Block 300 compares $y(k-1) - y^e(k-1)$ to $\epsilon_o$. If $y(k-1) - y^e(k-1)$ is greater than or equal to $\epsilon_o$, then block 302 sets $\Phi(.) = 1$. If $y(k-1) - y^e(k-1)$ is less than $\epsilon_o$, then block 304 compares $y(k-1) - y^e(k-1)$ to $\epsilon_o$. If $y(k-1) - y^e(k-1)$ is less than or equal to $-\epsilon_o$, then block 306 sets $\Phi(.)$ equal to $-1$. If $y(k-1) - y^e(k-1)$ is between $-\epsilon_o$ and $\epsilon_o$, then block 308 sets $\Phi(.)$ equal to $(y(k-1) - y^e(k-1))/\epsilon_o$.

At block 248 the Luenberger term is computed. At block 250, the damping force, $u(u_s(k-1), X^e(k-1))$, is determined from a three dimensional look-up table in response to $u_s(k-1)$ and $X^e(k-1)$ (or $X(k-1)$ if the measured relative system state includes relative velocity).

Block 312 computes $X^e(k)$, discretely, as follows:

$$X^e(k) = A_d X^e(k-1) + B_d u(k-1) + L_d(y(k-1) - y^e(k-1)) + N_d \Phi(y(k-1) - y^e(k-1)),$$

where:

$A_d = e^{A\tau}$, $B_d = \int_0^\tau e^{At} dt\, B$, $L_d = \int_0^\tau e^{At} dt\, L$, $S_d = \int_0^\tau e^{At} dt\, S$, and $N_d = \int_0^\tau e^{At} dt\, N$.

and where $\tau$ is the time period between successive estimations of $X^e(k)$ and e is the natural log base. At block 249, the estimation of the relative suspension system state, $y^e(k)$, is computed, at block 251, $y^e(k-1)$ is set equal to $y^e(k)$ and at block 251, $X^e(k-1)$, the previous estimated system state, is set equal to $X^e(k)$ and $y^e(k-1)$ is set equal to $y^e(k)$.

At block 412, the relative velocity is determined. The relative velocity may be determined as the distance travelled for a time period, or it may be determined as a frequency of pulses from a relative position sensor, such as the rotary encoder described above.

At block 414, the system determines if the present relative velocity signal has the same sign or a different sign than the previous relative velocity signal. If the signs of the relative velocity signal have changed, block 416 updates dt equal to the time period since the last sign change of the relative velocity signal. If there was not a sign change at block 414, block 417 determines if there have been at least 300 milliseconds since the last sign change. If yes, the value $\delta t$ is set to its maximum value at block 419. If not, the routine continues to block 418. At block 418, the gains are scheduled responsive to $\delta t$ and the routine continues to block 254.

At block 254, the computer computes $B^T P X^e(k)$. At block 253, the computer computes the product of the force computed at block 250 and $B^T PX^e(k)$, and if the result is not greater than zero, $u_s$ is set equal to zero at block 256. This test determines if the present force ($u(k-1)=u(u_s(k-1), X^e(k-1))$) is of proper direction, ensuring that the system operates only in the first and third quadrants as shown in FIG. 12 and is important because operation in the second and fourth quadrants could cause the system to become unstable or yield undesirable results; the product $u(k-1)B^T PX^e(k)$ is a signal indicating proper present actuator force direction if it is positive, and improper present actuator force direction if it is negative. (Note that in the case of a fully active suspension system, the calculated force at block 250 is of even greater importance, because, since active systems at times supply energy to the actuator, there is an even greater chance of system instability if operated in the second and fourth quadrants of FIG. 12.)

If the product at block 253 is greater than zero, then block 255 compares $\|B^T PX^e(k)\|$ to $\epsilon_d$. Block 256 sets $u_s$ to zero if $\|B^T PX^e(k)\|$ was less than or equal to $\epsilon_d$ at block 255. If $\|B^T PX^e(k)\|$ was not less than or equal to $\epsilon_d$ at block 255, then block 257 determines if $\|B^T PX^e(k)\|$ is between $\epsilon_d$ and $\epsilon$, if so, then block 258 computes $u_s$ as:

$$(B^T PX^e(k) - \|B^T P X^e(k)\| \epsilon_d / (B^T P X^e(k))) \rho / (\epsilon - \epsilon_d).$$

If $\|B^T PX^e(k)\|$ was not between $\epsilon_d$ and $\epsilon$ at block 257, then block 259 sets $u_s$ to command maximum possible actuator force. Block 260 outputs the command $u_s$, which controls actuator force, and returns to block 243 to repeat the loop.

Implementation of this invention into a suspension system results in suspension system control responsive to the entire suspension system state, enabling the increased controller response. The implementation illustrated above, results in a decrease in the magnitude of sprung mass displacement and velocity over the amount of sprung mass displacement and velocity in a passive suspension system. Sprung mass accelerations are also reduced. In the case of implementation of this invention into an active suspension, attitude control of the vehicle body is achievable. The amount of improvement will vary from implementation to implementation.

When using this invention in a vehicle, it is important to note that the present state of each quarter car suspeusion system and the road input are not the only factors that operate on each suspension system. The suspended mass of a vehicle is a semi-rigid body and the motion of each portion of the suspended mass generally affects the other portions of the suspended mass. The semi-rigid body motions of primary concern in a vehicle are heave, pitch and roll. Heave can be adequately controlled by four quarter car controllers described above. However, for improved control of pitch and roll, it may be desirable to take into account the semi-rigid nature of the entire sprung mass of the vehicle.

Figure 15:
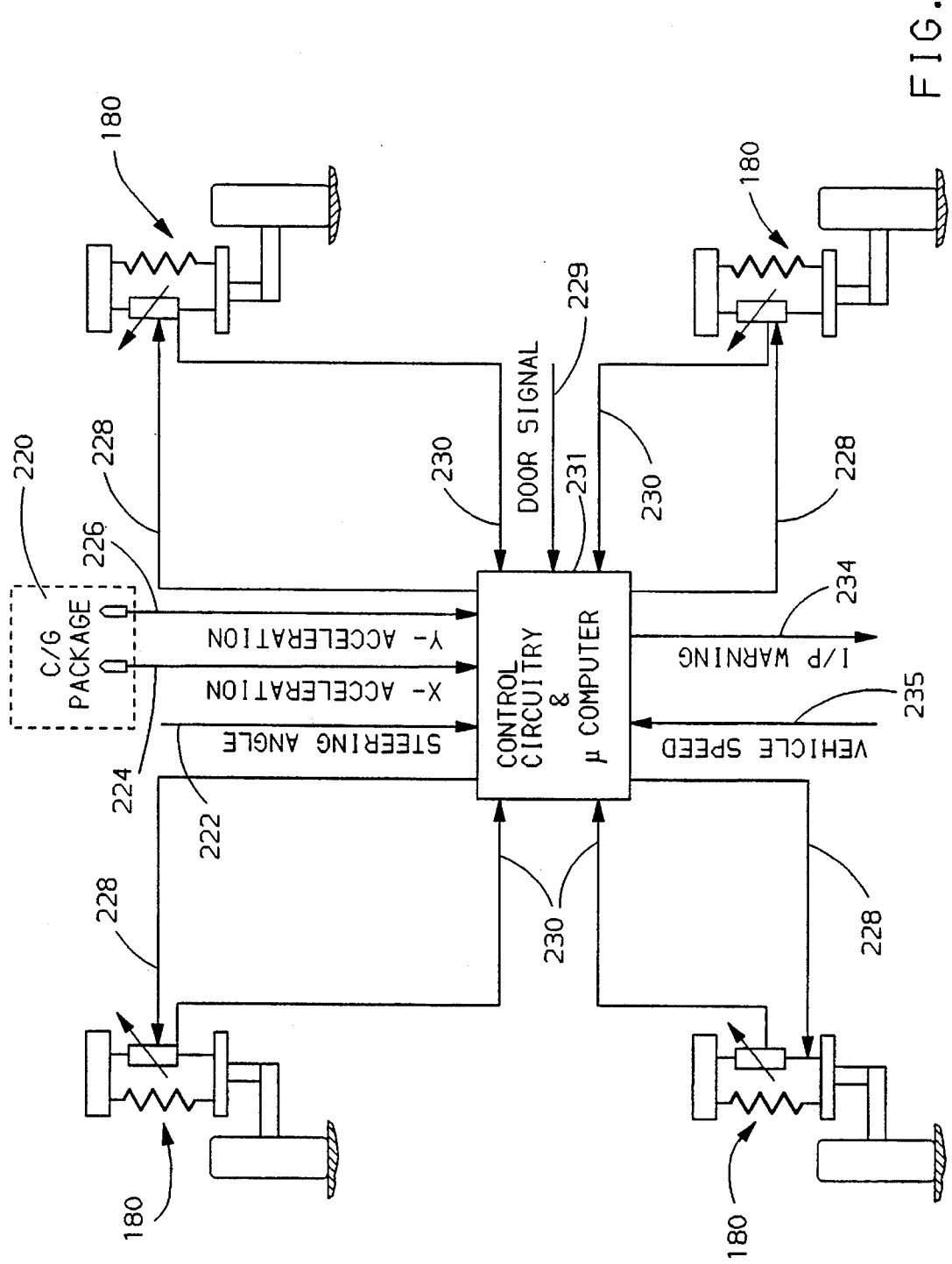
FIG. 15 is a schematic diagram of a vehicle variable force suspension system.

Referring to FIG. 15, the integrated semi-active suspension system includes four quarter car suspensions 180 including variable force actuators. Signals indicative of the relative system state (rattle space velocity or relative position between the sprung and unsprung masses) of each quarter car suspension are provided to the controller 231 through lines 230. Signals representative of forward acceleration and lateral acceleration are provided to the controller 231 through lines 224 and 226, respectively, from transducers in a package 220 located at the vehicle center of gravity. Alternatively, package 220 may be offset from the center of gravity of the vehicle with the offset taken into account to compute the forward and lateral acceleration of the vehicle. These computations are easily implemented by one skilled in the art.

Although pitch, roll and yaw rate may be taken into consideration, they are not considered necessary because a significant portion of vehicle pitch and roll deviations result from forward and lateral accelerations of the vehicle body and yaw rate is not significantly affected in a semi-active suspension system. Therefore, for the sake of simplicity, it is preferable that only forward and lateral acceleration be taken into account.

One alternative implementation for determining forward and lateral acceleration is to have signals indicative of steering wheel angle and vehicle speed on lines 222 and 235 from a rotary (RVDT) sensor (or equivalent) on the steering column and the vehicle speedometer signal (not shown) input into the controller 231. The controller 231 can determine forward acceleration through differentiation of the vehicle speed signal. For example, forward acceleration, $A_f(k)$, may be determined as follows:

$$A_f(k) = (v(k) - V(k-2))/(2\Delta\tau),$$

where $v(k)$ is the current vehicle speed, $v(k-2)$ is the vehicle speed two time events previously, and $\Delta\tau$ is one time event. Lateral acceleration can be determined in the controller from the vehicle speed and steering wheel angle through the following model, easily implemented by one skilled in the art:

$$a_y = v^w g \delta / (r_s (gL + K_{us} v^2))$$

where $a_y$ is the lateral acceleration of the vehicle, $v$ is the vehicle velocity, $g$ is gravitational acceleration, $\delta$ is the steering wheel angular displacement, $r_s$ is the steering gear ratio, $L$ is the wheel base, and $K_{us}$ is the under-steer coefficient. To reduce noise from the vehicle speed signal, $v$, the signal may be filtered through a low pass digital filter before the lateral acceleration is computed.

In the controller 231, determinations of forward and lateral acceleration are used to determine a minimum damping command, correlating to minimum damping forces, for the four quarter car suspensions. The greater the forward and/or lateral accelerations, the greater the minimum damping command. The controller 231 also estimates a state and determines a damping command for each quarter car suspension system as described above. The computer selects between the minimum damping command and the individual quarter car damping command for each quarter car system and issues a damping command through line 228 corresponding to the command that requires greater damping. By controlling the minimum damping as described above, deviations in pitch and roll can be minimized, providing increased road stability to the vehicle.

Figure 16:
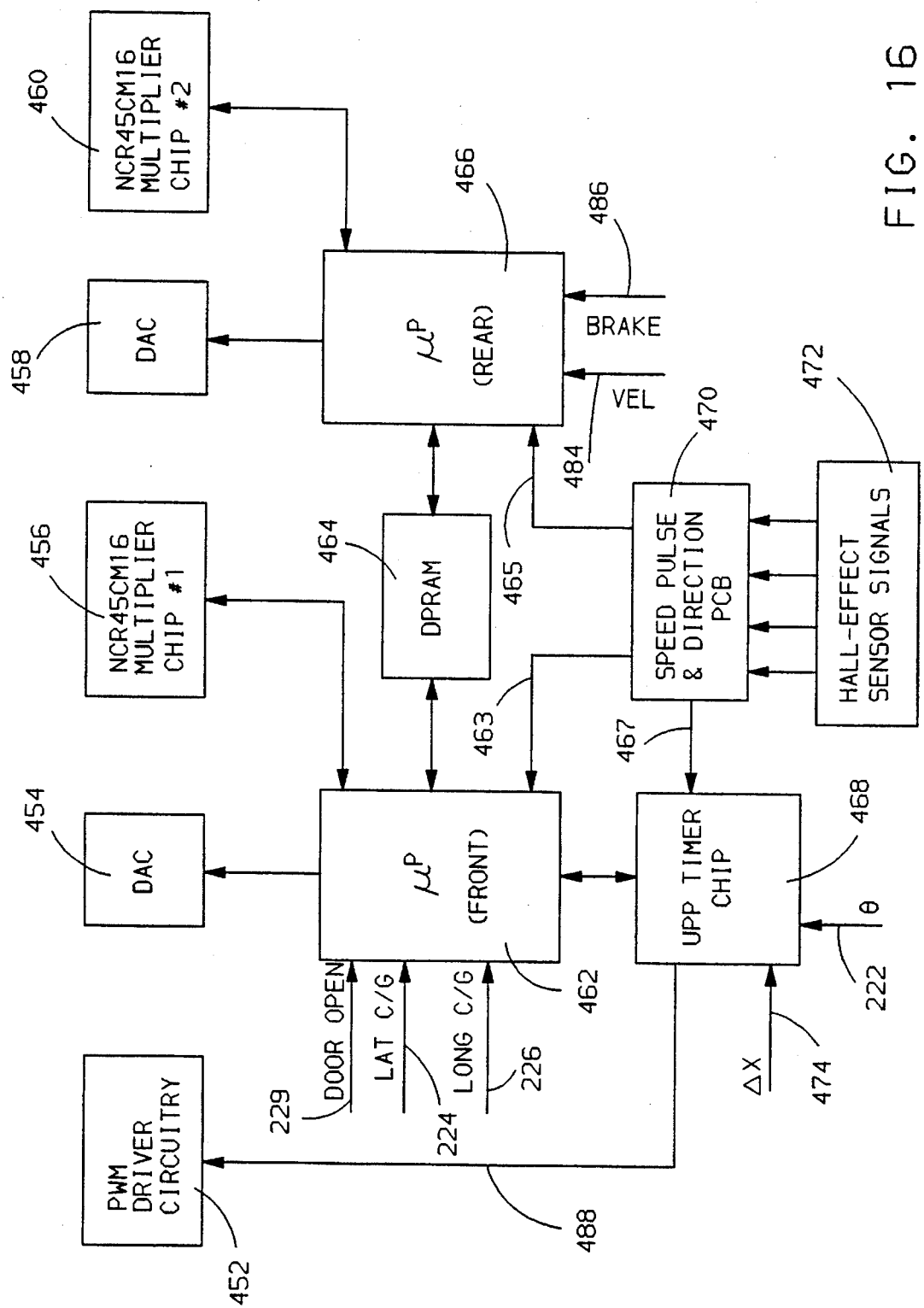
FIG. 16 is a detailed block diagram of the controller circuitry shown in FIG. 15.

The controller circuitry 231 is shown in more detail in FIG. 16 and includes two eight bit microprocessors 462 and 466 (68CH11s may be used for low cost), one computing the individual quarter car commands for two quarters of the vehicle, the other computing the individual quarter car commands for the other two quarters of the vehicle. In the illustration, microprocessor 462 computes the commands for the front two suspension and microprocessor 466 computes the commands for the rear two suspensions. Each microprocessor 462 and 466 runs the integration routine computing the minimum damping command. Dual port RAM 464 is used to exchange data between the two microprocessors. Each microprocessor 462 and 466 is interfaced with a math co-processor chip (456 and 460) to speed the computing power of the circuitry.

Each actuator 22 may contain three hall effect sensors which may be used to determine rattle space velocity and/or direction of rattle space movement. Block 472 represents the sensors in each quarter of the vehicle, and the signals are fed to speed pulse and direction circuitry that provides frequency and direction signals. A frequency signal is provided for each quarter car by combining the signals from the three hall effect sensors from the actuator in that quarter car suspension unit. The frequency of the resultant signal for each quarter car represents the magnitude of the rattle space velocity of that quarter car suspension and is coupled to the microprocessors 462 and 466 through UPP timer chip 468, through bus 467.

The rattle space velocity magnitude signals are received by microprocessor 462 from chip 468, and the rear velocity signals are provided to processor 466 through dual port RAM 464. The rattle space velocity directions are determined in relation to the order of signals from the hall effect sensors in each actuator and are provided directly to the microprocessors 462 and 466 through buses 463 and 465.

Although the hall effect sensors may be preferable in certain sensors, they are not necessary. Signals on bus 474, representing the relative displacement of the sprung and unsprung masses in each suspension unit may be fed to the UPP timer chip, and related therethrough to microprocessor 462, and through microprocessor 462 and dual access RAM 464 to microprocessor 466. Rattle space velocity and direction may be estimated from the relative displacement information using observer 195 (FIG. 5).

A steering wheel angle signal (line 222) is also fed to the UPP timer chip, which provides the information for the microprocessors 462 and 466. Sensor information such as a door open signal and lateral and longitudinal acceleration signals may be fed directly to microprocessor 462 through lines 229, 224 and 226. The vehicle velocity signal and brake signal may be fed directly to microprocessor 466 through lines 484 and 486.

With the information provided, microprocessor 462 computes the damping commands for the front two suspensions and feeds the commands to UPP chip 468. Microprocessor 466 computes the damping commands for the rear two suspensions and feeds the commands to dual port RAM 464, where it is read by microprocessor 462 and fed to UPP chip 468. UPP chip 468 outputs pulse width modulated commands to each quarter ear suspension through lines such as line 488, coupled to the PWM driver circuitry 452 for each quarter car suspension system.

Microprocessors 462 and 466, in conjunction with math co-processors 456 and 460, compute new individual quarter car commands every 2 ms and a new minimum damping command every 20 ms.

If this invention is to be implemented into a fully active system, microprocessor 462 outputs force commands for the front suspension to D/A converter 454, which outputs a signal used to drive motor control circuitry, providing the desired force for the front two suspensions. Likewise, microprocessor 466 outputs force commands for the rear suspension to D/A converter 458, which outputs a signal used to drive motor control circuitry for the rear two suspensions.

When this invention is implemented into an integrated vehicle system, various other factors should be taken into account. For example, when persons get into and out of the vehicle and when cargo is loaded to and unloaded from the vehicle, the sprung mass of the vehicle changes and the at-rest state of each quarter car suspension system changes (e.g., the distance between the sprung and unsprung masses when the vehicle is at rest changes). If only the relative velocity of the sprung and unsprung masses are measured, then the system automatically resets the at rest state with changes of vehicle load. If the relative position of each sprung and unsprung mass is measured, a line 229 can be implemented to receive a vehicle door signal indicating when a door has been opened and dosed. An easy implementation for this line is to wire it into the dome light circuit in the vehicle. When vehicle speed equals zero and the computer senses that a door has just been closed, it re-initializes the suspension system control, to set the new at-rest state of each quarter car suspension system as the reference state. A similar feature may also be implemented with a signal detecting opening and dosing of a vehicle trunk.

Although the sprung mass of the vehicle changes as passengers and cargo of the vehicle change, the control methods shown herein can robustly control the suspension system without changing the model parameters at every change in the sprung mass. However, if an LVDT/LVIT position sensor is used to measure the relative distance between the sprung and unsprung mass 12 and 24 (FIG. 1), then new at rest state can be used to determine the amount of mass in the vehicle, e.g., the greater the at rest distance between the sprung and unsprung masses, the smaller the sprung mass. The model parameters of matrices A and B can be adjusted accordingly. Although altering the matrices A and B may be desirable in certain implementations, it is not necessary.

If the computer detects a failure of the suspeusion control, e.g., zero current on line I (see FIG. 4) when the damper is commanded to have full damping, then a signal is sent through line 234 to an instrument panel warning light (not shown) to notify the vehicle operator.

Another optional feature that may be implemented with this invention is to command full damping at vehicle acceleration from a rest position to compensate for possible delays in receiving the speed signal that occur in some systems. This command can be triggered by change in throttle position, gear shift to drive, vehicle door dosing, or any parameter which indicates the vehicle might launch. Once the speed signal is sensed, damping is controlled as described above. A signal from the brake pedal can be used to indicate vehicle braking without computational delays.

Figure 17:
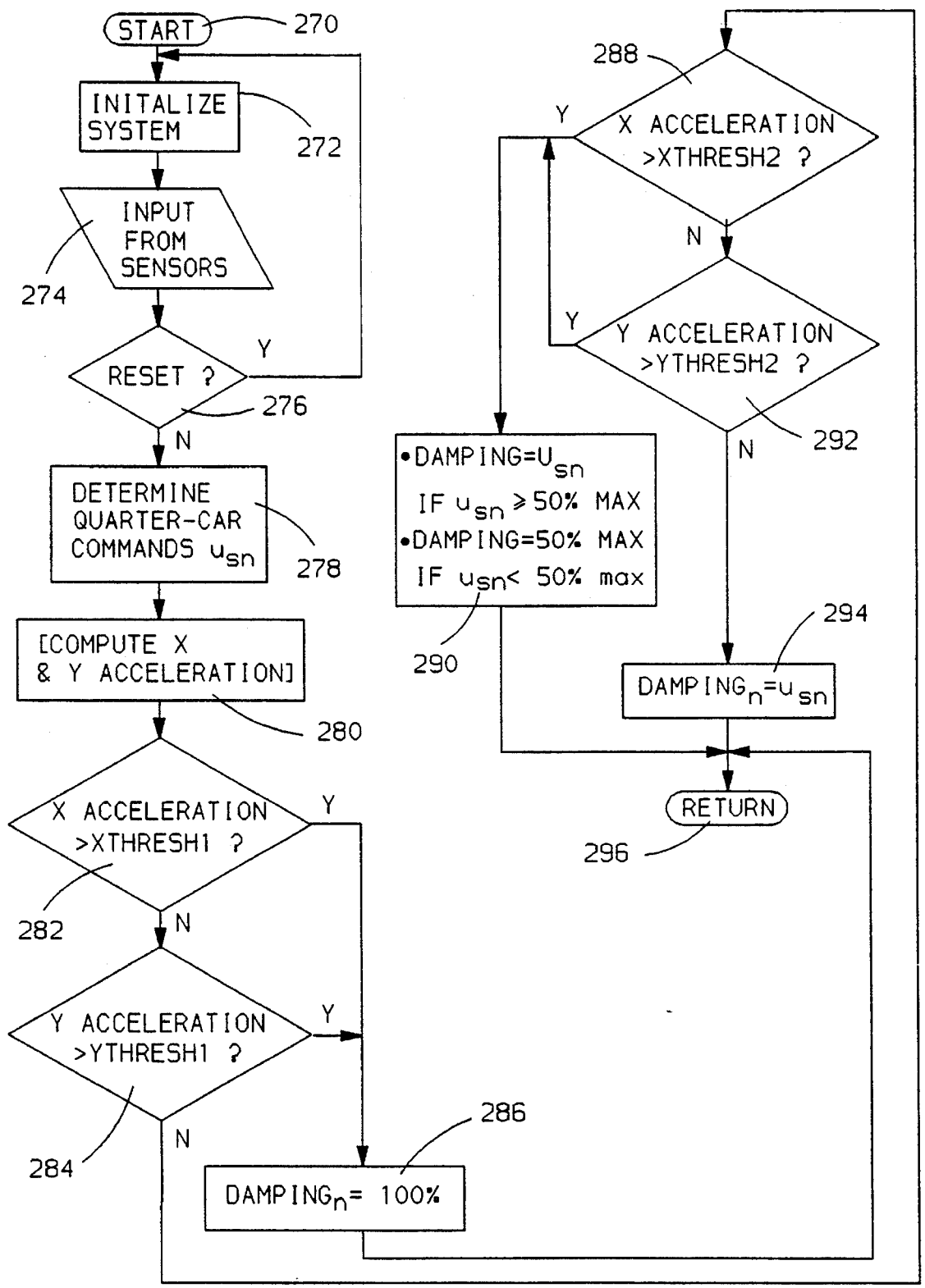
FIG. 17 is a flow diagram for a computer implementation of a vehicle variable force suspension control.

The flow diagram in FIG. 17 is one example of a flow diagram for computer implementation of the vehicle integration routine. The routine starts at block 270 and initializes at block 272, including determining the at rest state of each quarter car suspension. Sensor data is received at block 274 and block 276 determines if the system needs to be re-initialized, e.g., if a door was just opened or closed. At block 278, each of the quarter car commands, $u_s$, is determined as described above. At block 280, forward and lateral accelerations are computed if necessary, e.g., if the center of gravity package is offset or if the vehicle speed and steering angle are used to determine forward and lateral acceleration.

Blocks 282 and 284 determine if forward or lateral acceleration is above a first threshold, e.g., 0.5 G, if so, the minimum damping command is set at block 286 to 100% of the maximum damping available. Blocks 288 and 292 compare forward and lateral acceleration to a second threshold, which is less than the first threshold, e.g., .3G. If the forward or lateral acceleration is greater than the second threshold, but wasn't greater than the first threshold, then the minimum damping is set at block 290 to, for example, 50% of the maximum available damping. If neither the forward nor lateral accelerations is greater than the first or second thresholds, then the damping command for each quarter car 180 is set, at block 294, equal to the command $u_s$ determined for that quarter ear in accordance with the methods set forth above.

With the above implementation, this invention is used to control the driving performance of a vehicle based, not only on the individual state of each quarter car suspension, but on the effect of the whole suspended body of the vehicle.

The actuator described above may be used in an active suspension system by driving the actuator as a brushless DC motor when it is desired to provide positive actuator force. Known DC motor drive techniques may be used to control the actuator along with pulse width modulation of the drive current to control actuator force.

In active suspension system implementations, relative motion between the wheel and vehicle body may be caused by the application of power to the actuator as well as by road disturbances. Since gain shifting control is preferably responsive to relative motion caused by road disturbances and not to relative motion caused by the application of power to the suspension system actuator, the effect of the active actuator on the suspension system is taken into account when implementing this invention.

For example, when the active bandwidth of the actuator lies in the range of the frequency caused by road disturbance, the actuator affects the relative velocity signal. One solution is to split the active suspension control into ranges within and outside the bandwidth of the actuator. Gain shifting according to this invention is implemented when the sensed road disturbance is below (within) the bandwidth of the actuator. Beyond the bandwidth of the actuator, gain shifting according to this invention is deactivated, usually this is beyond the frequency of interest.

The control for the active suspension system itself may have dynamics that result in oscillations at the natural frequencies of the control system. These natural frequencies of oscillation can be determined and ignored when detected.

In a system in which the bandwidth of the active actuator is very broad so as to include frequencies beyond wheel hop mode and the control system has no significant oscillations (i.e., a static or well damped control), then the gain shifting according to this invention is carried out in the same manner described above with respect to the semiactive implementation.

The above described example implementations of this invention into a full car system describe four independent quarter car controllers. As an option, the control of the rear wheel gain selection can be in response to the relative velocity signal sensed by the front suspension and a time delay determined responsive to vehicle speed. This implementation eliminates the need for gain shifting control in response to relative velocity sensed in the rear suspensions and allows for adaptation of the rear suspensions to road conditions in anticipation of upcoming road events.

The above descriptions are example implementations of this invention using the electromechanical machine of actuator 22. This invention is not limited to the use of electromechanical actuators but may be used to observe the state of and to control any variable force suspension system which is controllable between at least two force states, as described above. Additionally, the methods and apparatus for determining actuator control set forth above are the preferred implementations and are not limiting on this invention. This invention encompasses the use of any suitable means for determining the actuator force control signal using the relative velocity sign change determination and gain shifting of this invention.

For example, a basic Skyhook control provides a control output as follows:

$$u = Gw x_1' + Gb x_2',$$

where Gw is the wheel gain, Gb is the body gain, $x_1'$ is the wheel velocity and $x_2'$ is the body velocity. The gains Gw and Gb can easily be scheduled according to this invention in response to relative velocity sign changes as described above.

As can be seen through the examples set forth above, the apparatus and method of this invention provide a suspension control system responsive to the entire system state. As is apparent to those skilled in the art, the implementations set forth above are illustrative examples and are not limiting on this invention, the scope of which is set forth below.

The embodiments of the invention in which an exclusive property or privilege is claimed are defined as follows:

1. A method of controlling a variable force vehicle suspension system comprising a wheel and a body comprising the steps of:

determining relative velocity between the wheel and the body;

detecting an occurrence of a present change in a sign of the determined relative velocity;

when the present change in the sign of the relative velocity is detected, determining a time lapse between a previous change in the sign and the present change in the sign, which time lapse is representative of a primary frequency component of the relative velocity;

scheduling, from a table in a computer memory, control gains responsive to the time lapse;

determining an actuator force command responsive to the scheduled control gains: and controlling the suspension system responsive to the actuator force command, wherein the control gains are rapidly scheduled responsive to a road input.

2. An apparatus comprising:

a variable force suspension system including a wheel, a body portion and a variable force actuator;

means for determining a relative velocity between the wheel and the body portion;

means for detecting an occurrence of a present sign change in the relative velocity;

means for determining a time lapse between the present sign change and a previous sign change in the relative velocity;

means for determining control gains responsive to the determined time lapse;

means for determining an actuator force command responsive to the control gains; and means for controlling the variable force actuator responsive to the actuator force command, wherein the control gains are rapidly determined responsive to a road input.

3. A method of controlling a variable force vehicle suspension system comprising a wheel and a body comprising the steps of:

determining a relative velocity between the wheel and the body, the relative velocity having a sign that periodically changes;

determining a time period between consecutive sign changes of the relative velocity, to thereby determine a frequency half period of a primary component of a frequency of the relative velocity;

determining at least one control gain value responsive to the determined frequency half period;

determining an actuator force command responsive to the control gain value; and controlling the suspension system responsive to the actuator force command, wherein the frequency half period of the relative velocity is used to quickly detect and respond to different road conditions.

4. An apparatus comprising:

a variable force suspension system including a wheel, a body portion and a variable force actuator;

means for determining a relative velocity between the wheel and the body portion, the relative velocity having a sign that periodically changes;

means for determining a time period between consecutive sign changes of the relative velocity, to thereby determine a frequency half period of a primary component of a frequency of the relative velocity;

means for determining at least one control gain value responsive to the determined frequency half period;

means for determining an actuator force command responsive to the control gain value; and means for controlling the suspension system responsive to the actuator force command, wherein the frequency half period of the relative velocity is used to quickly detect and respond to different road conditions.

* * * * *